United States Patent [19]
Donahue

[11] Patent Number: 4,598,481
[45] Date of Patent: Jul. 8, 1986

[54] INTERSECTING LASER ALIGNMENT APPARATUS AND METHOD

[75] Inventor: Robert L. Donahue, McPherson, Kans.

[73] Assignee: Hein-Werner Corporation, Waukesha, Wis.

[21] Appl. No.: 764,678

[22] Filed: Aug. 12, 1985

[51] Int. Cl.$^4$ .......................... G01B 5/03; G01B 11/03
[52] U.S. Cl. ................................ 33/288; 33/180 AT; 33/228; 33/DIG. 21
[58] Field of Search ................. 33/180 AT, 228, 288, 33/299, DIG. 21

[56] References Cited

U.S. PATENT DOCUMENTS

| | | | |
|---|---|---|---|
| 2,575,194 | 11/1951 | Smith | 33/288 |
| 3,611,575 | 10/1971 | Chartier | 33/288 |
| 3,962,796 | 6/1976 | Johnston | 33/288 |
| 4,015,338 | 4/1977 | Kuntz et al. | 33/228 |
| 4,319,402 | 3/1982 | Martin | 33/180 AT |
| 4,330,945 | 5/1982 | Eck | 33/288 |
| 4,383,373 | 5/1983 | Couturier | 33/228 |
| 4,442,608 | 4/1984 | Clausen | 33/228 |
| 4,454,659 | 6/1984 | Eck | 33/288 |
| 4,479,305 | 10/1984 | Wendl et al. | 33/180 AT |
| 4,490,915 | 1/1985 | Clausen | 33/288 |
| 4,513,508 | 4/1985 | Jarman et al. | 33/288 |

FOREIGN PATENT DOCUMENTS

| | | |
|---|---|---|
| 2642228 | 9/1976 | Fed. Rep. of Germany . |
| 2346681 | 10/1977 | France ............ 33/DIG. 21 |
| 167178 | 10/1968 | Norway . |

Primary Examiner—Richard R. Stearns
Attorney, Agent, or Firm—Litman, Day and McMahon

[57] ABSTRACT

An apparatus and method for determining the proper position of misaligned vehicle parts utilizes an X, Y and Z coordinate system to provide a proper point of position, or alignment, of vehicle parts which are identified in tables by such coordinates. The apparatus includes a framework which is established about the vehicle by transverse bars, datum plane bars, cross bars and a vertical standard, all with scale indicia, and forming a point of origin as on a graph. Lasers emitting planes of visible light are mounted on the datum plane bars and cross bar and project mutually perpendicular, intersecting planes of light. A laser is also mounted on the standard to project a horizontal plane of light that intersects the other two light planes and establishes a point capable of definition by X, Y and Z coordinates. The lasers are adjusted on the bars and standard to the measurements set forth in the table of coordinates and the error noted between the intersection point established by the X, Y and Z coordinates and the actual position of the misaligned part. Bending forces are applied to the frame area, or removal and replacement of parts is accomplished to correct the mispositioning or misalignment.

7 Claims, 11 Drawing Figures

INTERSECTING LASER ALIGNMENT APPARATUS AND METHOD

This invention relates generally to a device for checking and measuring the geometrical relationships of a vehicle frame and body and more particularly, relates to such a device having a straight line sighting instrument therewith, which is able to accurately determine the position of various portions of the vehicle.

BACKGROUND OF THE INVENTION

The frame and body of a vehicle is constructed with respect to precise geometric relationships, as determined by the manufacturer, in order that the vehicle have proper driving and road holding properties as well as accurate exterior design measurement locations for beauty of the finished body. Various apparatuses for effecting straightening of bent and damaged vehicle frame and body parts are known in the art, as are known various gauges, rules and the like for determining the amount of damage to the vehicle, frame and body members. These alignment measurement apparatuses are often unduly complex and cumbersome and require long periods of familiarization and usage in order for a vehicle frame and body repairman to become proficient in their operation.

The Eck U.S. Pat. No. 4,330,945, issued May 25, 1982, owned by Hein-Werner Corporation addresses the above problem and discloses a concept of using laser sighting instruments which sweep upwardly and downwardly and which are attached to the ends of transverse bars that mount below a vehicle parallel and equidistantly from the vehicle centerline. The present application, also assigned to the Hein-Werner corporation through its Kansas Jack division, further extends the concepts set forth in the Eck 945 patent and describes a device intended to enable precise placement of portions of the vehicle such as the upper portion of the medial pillar, and roof and portions of the front and rear fenders.

A recent trend in automobile construction has been that of space frame construction wherein a skeleton framework is fabricated by the automobile assembly plant, mounting pads are established at precise locations on the vehicle framework and the mounting pads are drilled to receive studs protruding from plastic body panels. The present General Motors Pontiac Fiero automobile is an example of such space frame and body panel construction. The body panels are typically formed by molding and have molded-in, nonadjustably positioned studs projecting therefrom. Thus, the positions of the mounting pads on the skeletal frame must be exact to specifications so that the body panels will fit properly into place. Previously, when vehicles were made of sheet metal welded and bolted onto either a unibody or separate frame construction, the body panels could be hammered or welded, pulled or stretched into place to repair damage. With the space frame and plastic panel construction, the ability of the repairman to manipulate the body panel into fitting onto the frame is lost.

With the space frame and plastic panel construction the plastic body panel may shatter on impact and the skeletal framework, with its attendant mounting pads, is likely to be displaced from its proper position. When the repairman attempts to position a new body panel onto the damaged framework, he finds that the panel studs no longer align with the mounting pads and the panel cannot be properly mounted. Nor can the repairman easily attach chains or the like to the damaged space frame components and pull out the damaged areas to properly position the mounting pads with respect to the panel studs because the panel obstructs the view of the repairman when he pulls on the framework to attempt to pull the mounting pads into position underneath the studs. The repairman thereby finds it exceedingly difficult to properly position the damaged area with its attendant mounting pads so that the studs of the new panel fit into place.

The above problem is widespread; some repairmen even go so far as to assert that such space frame construction cars are impossible to repair and decline to attempt repairwork, maintaining that when such cars are significantly damaged the only economic recourse available is to declare them a total loss for insurance purposes. This assertion has some merit, particularly when considering that the repairmen is speaking of his abilities to repair the vehicle using conventional tools available to the trade. The present invention is specifically designed for precisely affixing the position of an article, such as a space frame mounting pad, at a position in space which can be defined by X, Y and Z coordinates. The apparatus of the present invention enables extremely accurate positioning. Accuracy can be maintained within a quarter of an inch or less by the use of applicant's invention, utilizing a concept of orthogonally intersecting, collimated, coherent, laser generated planes of light, which when using tables of positions for each of the relevant space frame positioned mounting pads, critical junctures and the like are positioned at X, Y and Z coordinates to establish a point of intersection where the displaced vehicle part should be. Various means and pulling or pushing devices, as are well known in the art, are then applied to position the damaged part at the location and orientation established by the intersection of the laser planes set at the established X, Y and Z coordinates. This process is repeated for each of the mounting pads, as in the instance of a crushed body panel section, and then when the new body panel is applied to the corrected area, the panel studs fit into the mounting pads without problem if repair procedures have been carefully followed and measurements accurately determined.

OBJECTS OF THE INVENTION

The principal objects of the present invention are: to provide a system using X, Y and Z coordinates for positioning and alignment of vehicle frame and body portions; to provide an alignment apparatus and method that precisely locates objects in space; to provide an alignment apparatus and method which precisely locates objects in space by means of X, Y and Z coordinates; to provide an alignment apparatus and method providing intersecting locating beams of light by which it is possible to pull or place damaged portions into the intersecting light beams; to provide an alignment apparatus and method in which an operator can view the positioning of the alignment indicators relative to the damaged portion while directly at the work site; to provide an alignment apparatus and method which is adaptable to various alignment operations and applications; and to provide such an alignment method which is relatively easy to understand; adaptable in many situations; and in which operators can easily be trained to use.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 2:
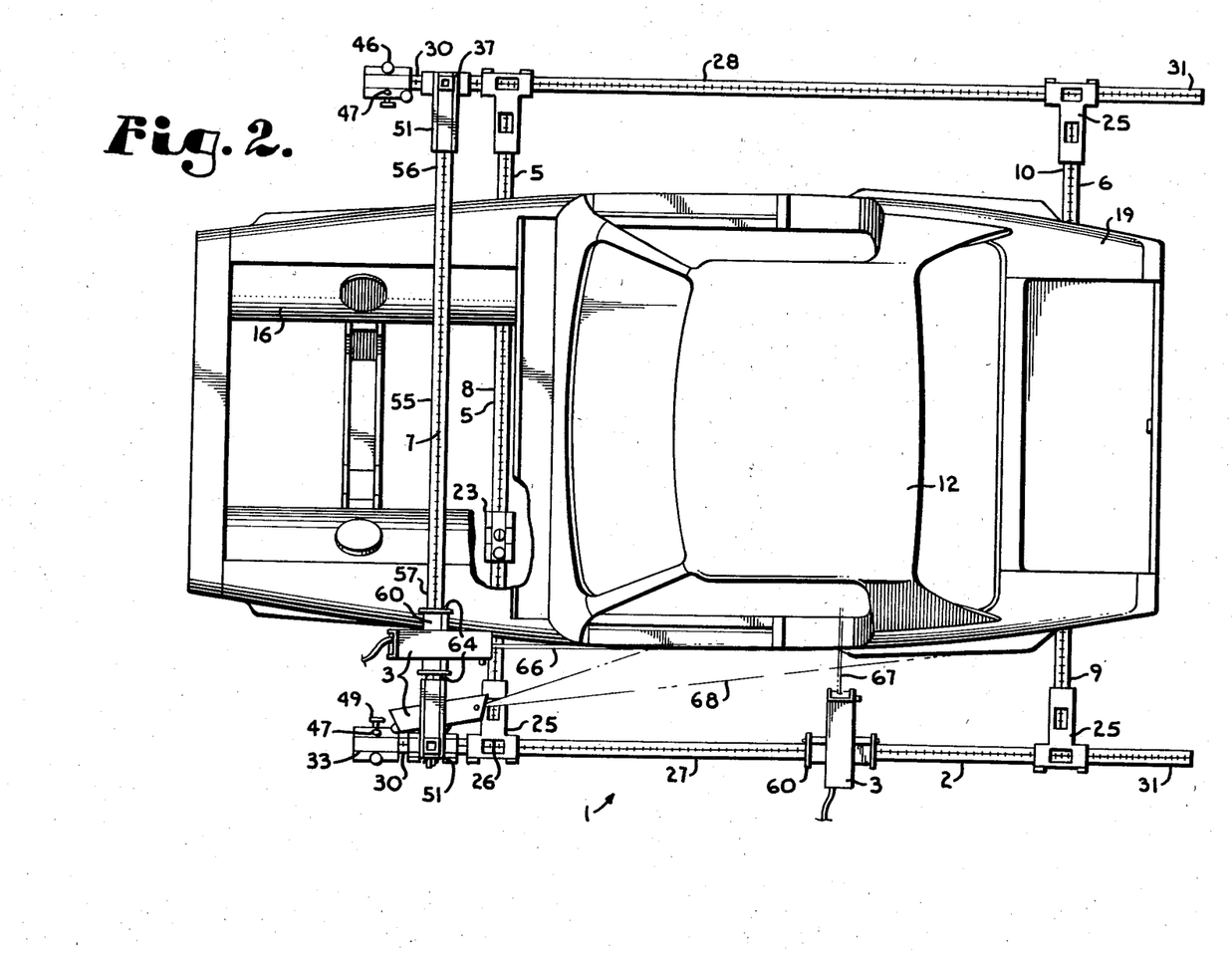
FIG. 2 is a plan view of the alignment apparatus positioned on a vehicle.
Figure 3:
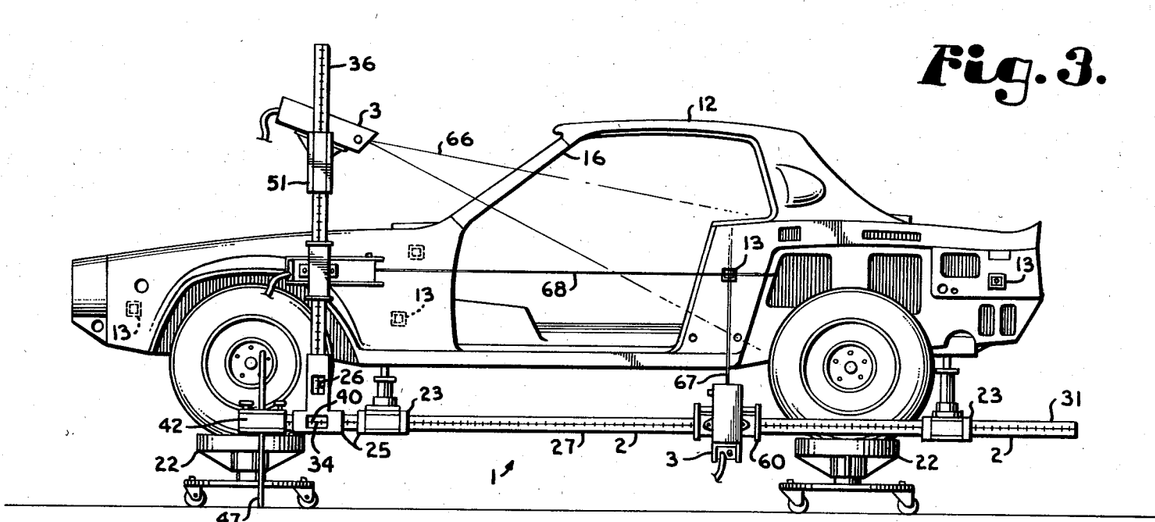
FIG. 3 is a side-elevational view of the alignment apparatus positioned on a vehicle.
Figure 4:
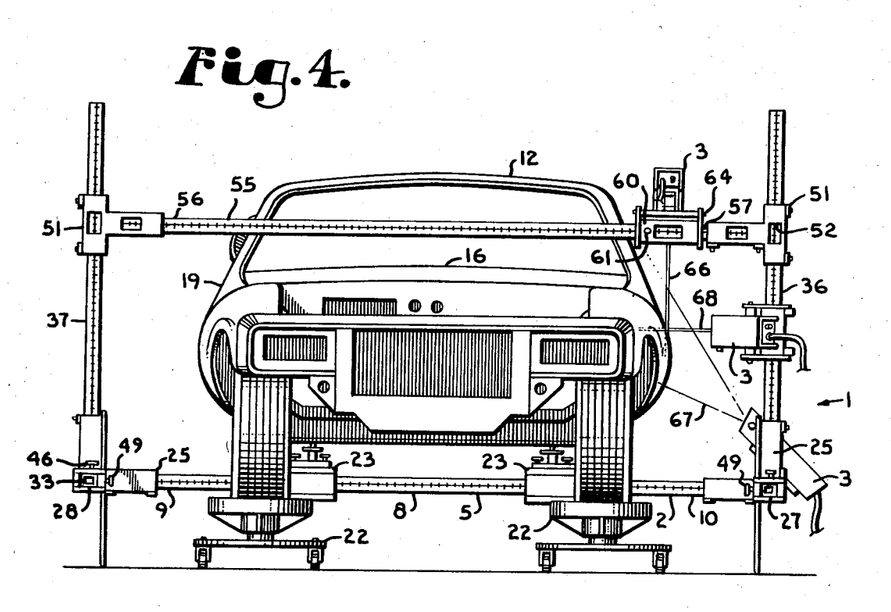
FIG. 4 is a front-elevational view of the alignment apparatus positioned upon a vehicle and showing a method of use.
Figure 5:
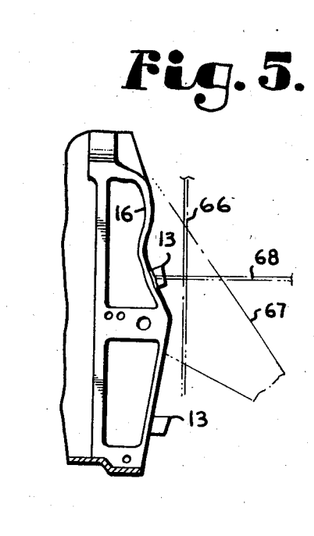
FIG. 5 is a fragmentary view showing intersecting planes of light emitted from the alignment apparatus and indicating displacement of a vehicle part from its proper position.
Figure 6:
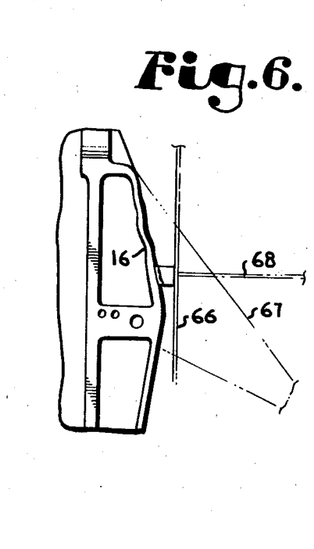
FIG. 6 is a fragmentary view of the intersecting planes of light and the vehicle part shown in FIG. 5 and manipulated into proper position.
Figure 7:
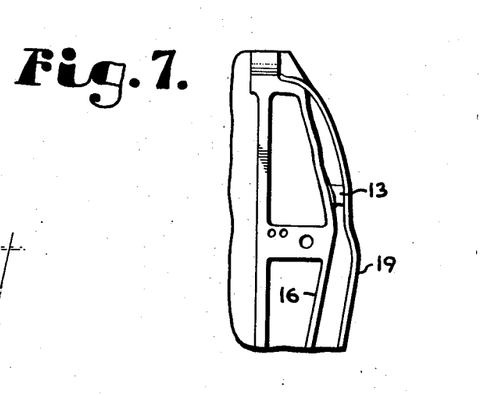
FIG. 7 is a fragmentary view of the portion of a vehicle shown in FIGS. 5 and 6 and showing a body panel positioned in place on the vehicle frame.
Figure 8:
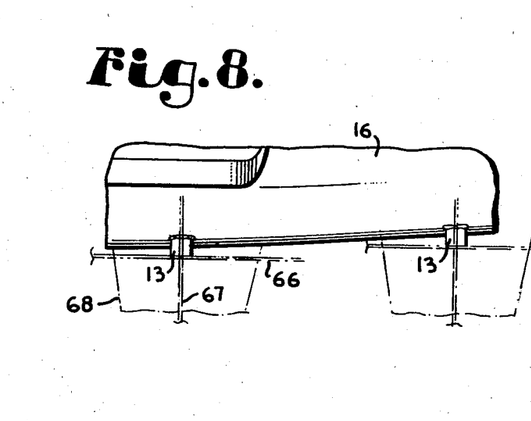
FIG. 8 is a fragmentary view of a portion of a space frame vehicle and showing the proper positioning of mounting pads by intersecting planes of laser light.

Referring to the drawings in more detail:

The reference numeral 1, FIGS. 2, 3 and 4, generally indicates a checking and measuring apparatus embodying the present invention. The apparatus 1 includes a frame arrangement 2, constructed so as to have X, Y and Z axes and which supports plane projecting laser instruments 3 mounted to have the projected planes intersect at selected points, thereby establishing a point defined by X, Y and Z coordinates. The proper X, Y and Z coordinate position of the vehicle part with respect to the alignment apparatus is listed in a reference manual provided to the repairman. Use of the apparatus in conjunction with the reference manual permits the repairman to accurately and quickly measure errors in the position of the vehicle part, which errors can result from improper construction, or through damage.

In the illustrated example, the frame arrangement 2 includes a pair of transverse bars 5 and 6, extending perpendicularly or 90° to the center line of the vehicle. Each of the bars is preferably noncircular in cross-sectional shape, such as square tubing having opposite side surfaces and upper and lower surfaces, all with scale indicia 7 thereon. The transverse bars 5 and 6 preferably respectively have zero marks at the midportions 8 of the bars. The bars 5 and 6 have opposite end portions 9 and 10 and the scale indicia 7 on the bars 5 and 6 numerically increase sequentially from the zero mark at the mid portion 8 so that equal distances on the bars 5 and 6 from the mid portion 8 can be readily determined.

Figure 9:
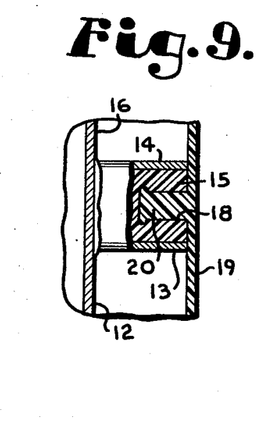
FIG. 9 is a fragmentary view showing a connection between body panels and space frame mounting pads.
Figure 10:
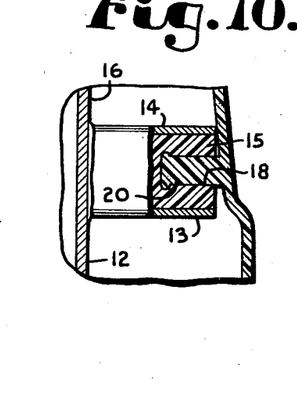
FIG. 10 is a fragmentary view depicting a second length of mounting pad and a second configuration of body panel which may be affixed to the mounting pad.

The transverse bars 5 and 6 are positioned under a vehicle 12, which may be of space frame construction, as in the General Motors Pontiac Fiero automobile, and the vehicle 12 generally includes a frame 16 forming a cage for body panels 19 which are later mounted to the frame and provide a finished body surrounding the passenger compartment and engine section. These body panels 19 are fitted onto the frame 16 by simple studs or bolts 20 projecting from the panels 19 which extend into special mounting pads 13 precisely positioned at selected locations on the vehicle frame, FIGS. 9 and 10. Each of the mounting pads 13 consists of a metal shell 14 which is secured, as by welding, to the vehicle frame and which contains a core area filled by an inner plug of resinous epoxy material 15. The mounting pads 13 are relatively precisely positioned onto the vehicle 12, such as within ¼ inch, however, some small dimensional deviations may be present.

In the assembly process, after the space frame 16 is constructed, and the mounting pads 13 roughly positioned, it is conveyed to a large milling and drilling machine, called a Gilman Drill and Mill, wherein the space frame 16 is held precisely in place. Then many drills and milling tools, which are precisely positioned in the machine, simultaneously drill and machine all the attachment points, the mounting pads 13, around the body to exact tolerances. Thus, the drill bore 18 may not be exactly centered on the pad 13 but may be slightly off center. The tool also mills the axial length of the mounting pad 13 so that it is the proper height on the space frame 16 for attachment of the body panel 19. Some mounting pads 13 are supposed to have greater height than others, FIGS. 9 and 10. Connection is made by bolts or, as in the illustrated example, the studs 20 extending from the panel 19 and into the bores 18.

The panels 19 are normally formed from plastic material and when involved in a collision they often shatter or crack. Repairs are made by replacement of the panel rather than attempting to bend or pound the panel back into shape, as was previously done with metal panels. When the space frame members below the panel are too deformed, extreme problems are encountered by the repair person in attempting to get the mounting pads 13 to align with the fixed position studs 20. The X, Y and Z coordinate system and apparatus 1 is mounted about the vehicle as described below and, using same, a repair person can determine the proper position in three dimensional space of each of the mounting pads 13. Thus, when the replacement panel 19 is positioned against the appropriate area of the damaged space frame 16, the panel fits properly into place without bending or pounding.

To connect the frame arrangement 2 to the vehicle 12, the vehicle 12 is first positioned on wheel supports 22 for ease of access to the vehicle undercarriage. At least two transverse bars 5 and 6, one mounted toward the front of the vehicle and the other mounted toward the rear of the vehicle, are positioned below the vehicle and are mounted perpendicularly of the vehicle longitudinal centerline. The transverse bars 5 and 6 are suspended beneath the vehicle 12 by vehicle mounting means 23 such as described in Hein-Werner's Eck Patent No. 4,454,659. These mounting means 23 include fingers which engage the vehicle 12 at selected locations and sleeve brackets through which extends a respective bar 5 or 6. The bars 5 and 6 are slid longitudinally through the brackets of the mounting means 23 so that the zero mark on the bar midportion 8 aligns with the vehicle centerline. End fittings in the form of tees 25 containing windows 26 are fitted to the opposite end portions 9 and 10 of the transverse bars 5 and 6. Datum plane bars 27 and 28, also non-circular elongate bars, such as of square tubing, are extended through the tees 25. The tees 25 are positioned on the transverse bars 5 and 6 so that identical scale indicia 7 are centered with respect to the windows 26; the transverse bars are cut to exact length so that this readily occurs. The datum plane bars 27 and 28 are positioned parallel to the vehicle centerline and perpendicular to the transverse bars 5 and 6 by sliding the bars 27 and 28 through the tees 25 on the ends of the transverse bars 5 and 6. Preferably, the transverse bars 5 and 6 are of identical length and the datum plane bars 27 and 28 are of a second, also identical length longer than the bars 5 and 6. The datum plane bars 27 and 28 have respective forward ends 30 and rearward ends 31 with scale indicia 7 also extending therebetween.

The scale indicia 7 of the datum plane bars 27 and 28 includes a zero mark 34 positioned adjacent the forward end 30 of the datum plane bars 27 and 28. From the zero mark 34, the scale indicia 7 numbers increase toward the rear end 31 of the bars 27 and 28. The zero mark 34 serves as a point of origin as set forth below.

Figure 1:
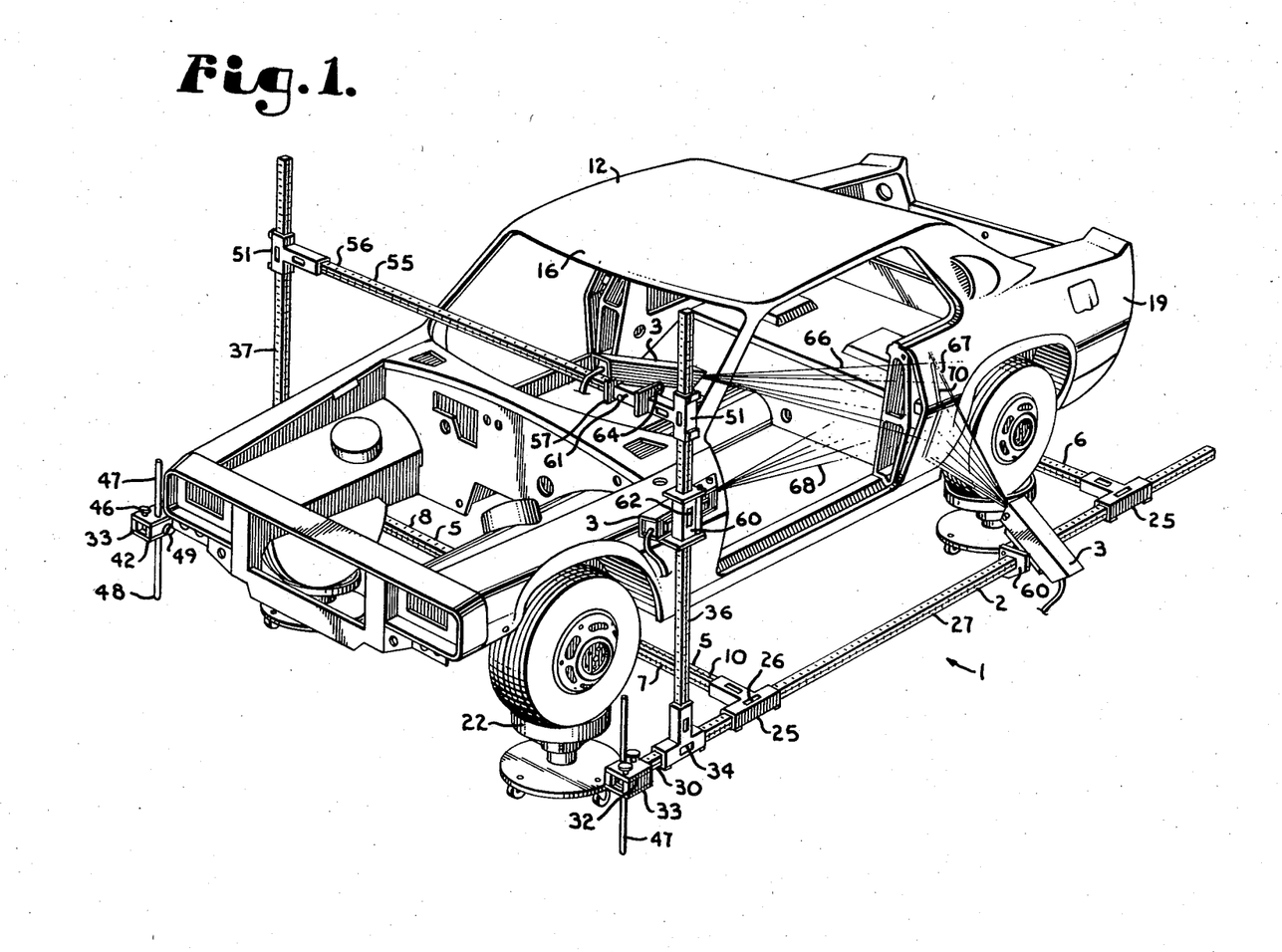
FIG. 1 is a perspective view of the alignment apparatus and showing same positioned upon a vehicle of space frame construction.

A tee 25 is mounted on the forward end 30 with its window 26 centered on the datum plane bar zero mark 34. The tee 25 extends upwardly, and sleeved into the upper part of the tee 25 is a vertically extending standard 36, similarly of elongate square tubing. In the illustrated example, FIGS. 1 and 4, two standards 36 and 37 are mounted onto the respective forward ends 30 of the datum plane bars 27 and 28 by the tees 25. The standards 36 and 37 also include scale indicia 7 which are numbered off scale at a lower end of the standard and are positioned with respect to a window so that a zero mark could be colocated with zero mark 34 of the datum plane bar 27 or 28, therey colocating the points of origin of the X and Y scales. The measurements on the standards 36 and 37 with the scale indicia 7 are made so that an origin 40 is established at the zero mark 34 of the datum plane bar to create an X-Y coordinate system between the standards 36 and 37 and the datum plane bars 27 and 28.

Figure 11:
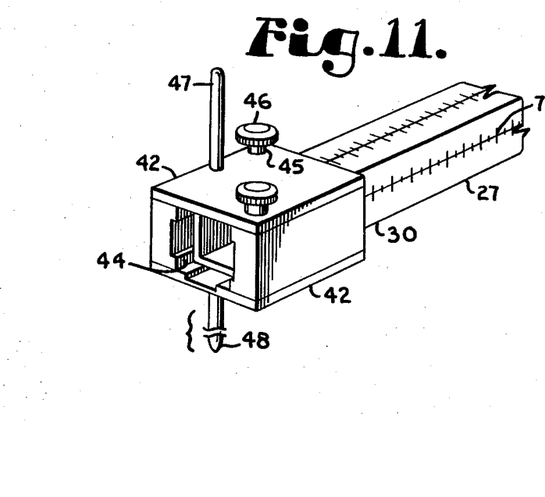
FIG. 11 is an enlarged, fragmentary view of a portion of the alignment apparatus.

To prevent the forward ends 30 of the respective datum plane bars 27 and 28 from deflecting downwardly due to the application of weight, a bar support 42, FIG. 11, is mounted thereon. The exemplary bar support 42 consists of a sleeve bracket 43 with an interior way 44 through which the bar 27 or 28 extends. The sleeve bracket 43 is selectively affixed to the bar along the bar length by locking screws 45 tightenable by thumb wheels 46. A support bar 47 extends through the sleeve bracket 43 and has a lower end 48 which rests upon a floor surface, FIG. 3. The support bar 47 is selectively tightenable with respect to the sleeve bracket 43 by a thumb screw 49. While the frame arrangement 2 is being assembled on the vehicle 12, the datum plane bars 27 and 28 are suspended upon the transverse bars 5 and 6 and the bar support 42 adjusted and tightened into position with the rod 47 engaging the floor. This is done prior to applying weight on the datum plane bar forward ends 30 to resist deflection under load and consequent error.

The standards 36 and 37 extend upwardly from the respective datum plane bars 27 and 28 and are connected thereto by tees 25. Like tees 51 are positioned on the standards 36 and 37 evenly and upwardly of the juncture of the standards with the datum plane bars 27 and 28, the upward displacement of which is determined by reference to scale indicia through a window 52 in the tee 51.

A crossbar 55 is situated between the standards 36 and 37 and is preferably of the same length as the transverse bars 5 and 6. The crossbar 55 also has scale indicia 7 thereon with zero marks 56 commencing at each of the opposite ends 57 and 58 of the crossbar 55.

The transverse bars 5 and 6 supporting the datum plane bars 27 and 28 in turn supporting the standards 36 and 37 connected by the crossbar 55, together constitute the frame arrangement 2 constructed about the vehicle 12. Note that the transverse bars 5 and 6 are perpendicular to the longitudinal axis of the vehicle 12, the datum plane bars 27 and 28 are parallel to the vehicle centerline, positioned along the vehicle sides, and are therefore perpendicular to the transverse bars 5 and 6. The datum plane bars 27 and 28 thereby provide a Y axis for the measuring apparatus 1 and crossbar 55, extending between the standards 36 and 37, provides an X axis when viewed from above the vehicle, FIG. 2.

The scale indicia 7 of the crossbar 55 increase from the ends 57 and 58 so that the point of origin of the X axis is established slightly beyond the juncture of the crossbar 55 with the datum plane bar 27 or 28. The crossbar 55 and the datum plane bars 27 and 28 are physically displaced vertically by the respective standards 36 and 37, and therefore the point of origin for the graph established by the crossbar 55 and the datum plane bars 27 and 28 extends centrally through the standards 36 and 37.

The crossbar 55 can be mounted at various heights on the standards 36 and 37 and care must be taken by the repair person to ensure that the crossbar 55 is not tilted, but is spaced equidistantly from the datum plane bars 27 and 28. Preferably, the crossbar 55 is positioned with respect to the vehicle 12 so that the crossbar 55 is above a hood or a trunk area, FIG. 1, so that a major portion of the vehicle body lies between the X and Y axes respectively established by the crossbar 55 and the datum plane bars 27 and 28.

A plurality of laser instruments 3 are mounted on the frame arrangement 2. In the illustrated example, the laser instruments are each low powered industrial lasers such as used for surveying and calibration and are each capable of projecting either a cylindrical or pencil beam of laser generated light, or a plane or fan of light. Such an instrument is described in application for patent Ser. No. 701,691, licensed to the Kansas Jack Division of Hein-Werner Corporation. Each of the laser instruments 3 is mounted on a sleeve carriage 60 which includes a thumb screw 61 for locking the carriage 60 at a selected position on the bar, whether it be the datum plane bar 27 or 28, the standard 36 and 37, or the crossbar 55. The carriage 60 also has a window 62 centered with respect to the laser instrument 3 for viewing the scale indicia 7 directly under the projected laser beam. The laser instrument 3 is mounted to the carriage 60 by a pivot 64 so that the laser 3 may sweep perpendicularly with respect to the orientation of the carriage 60. In practice, the pivot 64 is of occasional use when the laser instrument projects a fan or plane pattern and is most useful when the pencil beam pattern is selected.

To establish the X, Y and Z coordinate system apparatus 1 on the framework 2, one of the laser instruments 3 by its carriage 60, is mounted on the crossbar 55 to project a plane of light 66. Another of the laser instruments 3 is mounted on either of the datum plane bars 27 or 28 to project a plane of light 67 and yet another laser instrument 3 is mounted on the standard 36 or 37 adjoining the respective datum plane bar 27 or 28 to project a plane of light 68. Two sighting instruments 3 are employed to provide an X—Y coordinate system, one mounted on the crossbar 55 and the other mounted on the datum plane bar 27 or 28 so that the planes of light 66 and 67 intersect. To provide a vertical dimension, or Z axis, a laser instrument 3 is mounted on one of the standards 36 or 37. As indicated in connection with FIG. 1, the laser instruments 3 are positioned on their carriages 60 to provide the fan or planar beam of light 68 which is perpendicularly oriented. The vertically oriented planes of light 66 and 67 from the laser instruments 3 mounted on the crossbar 55 and the datum plant bars 27 or 28 meet in a vertically extending line 70, FIG. 1. The laser instrument 3 mounted on the standard 36 or 37 is selectively positionable vertically on the standard and projects the horizontal plane of light 68. The intersection of the three planes of light 66, 67 and 68, two vertical and one horizontal, provides a three dimensional crosshair point at which measurements are taken.

In the use of the apparatus 1, the workman first raises the vehicle on the wheel supports 22 and then positions the transverse bars 5 and 6 underneath the vehicle, suspending the bars 5 and 6 by the vehicle mounting means 23. The bars 5 and 6 are positioned so that the zero mark on their midportions is generally under the vehicle centerline and so that equal amounts of the end portions 9 and 10 project outwardly from the vehicle sides. Next, the datum plane bars 27 and 28 are respectively mounted at the ends of the transverse bars 5 and 6. The bar supports 42 are attached and the support rods 47 extended downwardly to engage the floor and lock into position to prevent downward deflection of the bars 27 and 28. The standards 36 and 37 are then mounted on the datum plane bars 27 or 28 toward the forward end of the vehicle. The crossbar 55 is next positioned between the standards 36 and 37 and elevated to a comfortable working heighth relative to the vehicle 12.

Next, the laser instruments 3 are mounted onto the datum plane bars 27 or 28, crossbar 55 and standards 36 or 37 so as to project intersecting planes of light in X, Y and Z coordinate relationship.

From the above description, it will be readily seen that the position of any point on the vehicle can be determined by means of X, Y and Z coordinates. To determine where these parts, body sections, and, particularly, the mounting pads 13 are supposed to be, the repairman must consult an appropriate vehicle handbook containing tables identifying the proper position of the parts. For example, a mounting pad identified by Numeral 24 in the handbook table may be listed as having an X coordinate of 30, a Y coordinate of 32 and a Z coordinate of 18. To fix the location of the point defined by the intersection of the X, Y and Z coordinates, the laser instrument on the crossbar 55 is moved so that the indicia 30 appears centered in the carriage window 62 and the laser instrument switched on, thereby projecting the vertical plane of light 66 at a 30 inch or 30 millimeter mark from the origin. To set a Y coordinate of 32, the laser instrument 3 on the appropriate datum plane bar 27 or 28 is moved to the indicia 32 on the bar 27 or 28 and the laser instrument 3 switched on to project the vertical plane of light 67 perpendicularly intersecting the plane of light 66 projected by the laser instrument on the crossbar 55. Thus, a point defined by X and Y coordinates is created and a point is identified in two-dimensional space. However, the vehicle 12 is a three-dimensional object and the Z coordinate must be identified. To do so, the laser instrument 3 on the standard 36 or 37 is moved to the indicia 18 inches or millimeters from the origin and the instrument switched on to project the horizontal plane of light 68 which intersects the two vertical planes of light 66 and 67 from the laser instruments on the datum plane bars 27 and 28 and on the crossbar 55. By the three laser instruments, a point in space is identified by X, Y and Z coordinates.

Accordingly, the Number 24 mounting pad should be at the intersection of the three laser planes. If it is not, the repairman can leave the lasers switched on and attach appropriate chains, rams and the like to affect a pull or a push on the disturbed structural member to push same back into shape and position the Number 24 mounting pad at the center of the crosshair arrangement defined by the laser beams 66, 67 and 68. Leaving the lasers switched on, the repair man can visually determine the rate at which the damage is being removed and the precise point of which sufficient force has been applied to the damaged or misplaced portions and is thereby able to cease operation then.

In the overall aspects of the method of use of the apparatus 1, the workman first establishes a datum plane of reference, the datum plane bar, along the side of the vehicle and parallel to the vehicle centerline, thereby providing a Y axis. Next, he establishes a cross reference, the crossbar, adjacent an end of the vehicle and perpendicular to the vehicle centerline, thereby providing an X axis. The workman then uses the laser sighting instruments which project planes of visible light, and mounts one of the sighting instruments on the datum plane instrument and another one of the sighting instruments on the cross reference so that the respective emitted planes of light project vertically and intersect. The point of intersection is then measured with respect to the position of the sighting instruments on the datum plane reference and the cross reference to establish X and Y coordinates identified by the respective intersecting planes of light.

To provide the Z coordinates, the workman establishes a standard extending upwardly and perpendicularly from the origin of the datum plane and cross references and mounts a sighting instrument on the standard so that the plane of light from the sighting instrument on the standard intersects the juncture of the planes of light of the sighting instruments on the datum plane and cross references.

Use of the apparatus 1 by the workman becomes routine with practice and its accuracy is, of course, dependent upon the accuracy and care taken by the workman in setting up the frame arrangement 2 about the vehicle 12. By the use of the apparatus 1 proper and precise position of each body part or portion on one side of the vehicle can be measured with respect to its symmetrical partner on the other side of the vehicle and the degree, if any, of assymmetry noted. By use of a look up table contained in a vehicle handbook reference, the desired position of each of the body and frame reference points can be determined and the sighting instruments set to project in space the desired location of the vehicle part, whether or not that part has been displaced. If it is displaced, then corrective measures are undertaken to position that part to where it is desired to be located.

It is to be understood that while one form of this invention has been illustrated and described, it is not to be limited to the specific form or arrangement of parts herein described and shown, except in so far as such limitations are included in the following claims.

What is claimed and desired to be secured by Letters Patent is as follows:

1. A method for checking the alignment of vehicle frames and bodies comprising the steps of:
   (a) establishing a datum plane reference along a side of a vehicle and parallel to the vehicle centerline, thereby providing a Y axis;
   (b) establishing a cross reference adjacent an end of the vehicle and perpendicular to the vehicle centerline; thereby providing an X axis;
   (c) providing sighting instruments projecting planes of visible light and mounting one of the sighting instruments on the datum plane reference and another of the sighting instruments on the cross reference so that the respective emitted planes of light project vertically and intersect;
   (d) measuring the respective positions of the sighting instruments along the cross and datum plane references, taken from the intersections of the cross and datum plane references, thereby establishing X, Y coordinates for the intersection of the respective planes of light.

2. A method for checking the alignment of vehicle frames and bodies comprising:
   (a) providing a datum plane reference along a side of a vehicle and parallel to the vehicle centerline, thereby establishing a Y axis;
   (b) providing a cross reference adjacent an end of the vehicle and perpendicular to the vehicle centerline, thereby establishing an X axis;
   (c) joining the datum plane and cross references to provide an origin;
   (d) providing a standard extending upwardly and perpendicularly from said origin, thereby establishing a Z axis;
   (e) providing sighting instruments projecting planes of visible light;
   (f) mounting the sighting instruments respectively to the datum plane reference and cross reference so that the respective planes of light project vertically and intersect and mounting another of the sighting instruments to the standard so that the plane of light projects horizontally and intersects the juncture of the planes of light from the sighting instruments on the datum plane and cross references;
   (g) measuring the distances from the origin to the sighting instruments, thereby establishing X, Y and Z coordinates.

3. A method of determining the proper position of misaligned portions of vehicle frames and bodies comprising the steps of:
   (a) providing a datum plane reference along a side of a vehicle and parallel to the vehicle centerline, thereby establishing a Y axis;
   (b) providing a cross reference adjacent an end of the vehicle and perpendicular to the vehicle centerline, thereby establishing and X axis;
   (c) joining the datum plane and cross references to provide an origin;
   (d) providing sighting instruments projecting planes of visible light;
   (e) mounting the sighting instruments respectively to the datum plane and cross references so that the planes of light project vertically and perpendicularly and intersect;
   (f) providing a table of vehicle frame and body portions in proper relationship expressed in X and Y dimensions and looking up in said table the dimensions for a selected portion;
   (g) moving the sighting instruments along the datum plane reference, and cross reference to the dimensions set forth in said table, as measured from said origin;
   (h) projecting the planes of light from the sighting instruments to the point established by the X and Y dimensions set forth in said table;
   (i) determining the location of the selected vehicle portion relative to the point established by the X and Y dimensions; and
   (j) correcting the vehicle portion to coincide with the point established by the X and Y dimensions, thereby aligning the misaligned portion.

4. A method of determining the proper position of misaligned portions of vehicle frames and bodies comprising the steps of:
   (a) providing a datum plane reference along a side of a vehicle and parallel to the vehicle centerline, thereby establishing a Y axis;
   (b) providing a cross reference adjacent an end of the vehicle and perpendicular to the vehicle centerline, thereby establishing an X axis;
   (c) joining the datum plane and cross references to provide an origin;
   (d) providing a standard extending upwardly and perpendicularly from said origin, thereby establishing a Z axis;
   (e) providing sighting instruments projecting planes of visible light;
   (f) mounting the sighting instruments respectively to the datum plane and cross references so that the planes of light project vertically and perpendicularly and intersect; and mounting another of the sighting instruments to the standard so that the plane of light intersects the juncture of the planes of light from the sighting instruments on the datum plane and cross references;
   (g) providing a table of vehicle frame and body portions in proper relationship expressed in X, Y and Z dimensions and looking up in said table the dimensions for a selected portion;
   (h) moving the sighting instruments along the datum plane reference, cross reference and standard to the dimensions set forth in said table, as measured from said origin;

(i) projecting the planes of light from the sighting instruments to the point established by the X, Y and Z dimensions set forth in said table;

(j) determining the location of the selected vehicle portion relative to the point established by the X, Y and Z dimensions; and (k) correcting the vehicle portion to coincide with the point established by the X, and Y, and Z dimensions, thereby aligning the misaligned portion.

5. An alignment measuring and checking apparatus for vehicle frames and bodies comprising:

(a) a datum plane bar mounted along a side of said vehicle and parallel to the centerline thereof;

(b) a crossbar mounted adjacent an end of said vehicle and perpendicular to the centerline thereof;

(c) said datum plane bar and said crossbar having scale indicia thereon;

(d) a plurality of sighting instruments emitting planes of light and means slidably mounting said sighting instruments to said datum plane bar and said crossbar so that said planes project perpendicularly thereto;

(i) a first sighting instrument mounted on said crossbar, projecting a vertical plane of light, and establishing an X axis; and (ii) a second sighting instrument mounted on said datum plane bar and projecting a vertical plane of light, thereby establishing a Y axis, and intersecting the plane of light from said first sighting instrument, whereby a point on said vehicle can be expressed in X, Y and Z coordinates and its position determined in said vehicle.

6. An alignment measuring and checking apparatus for vehicle frames and bodies comprising:

(a) a pair of transverse bars having opposite end portions;

(b) means positioning said transverse bars beneath said vehicle and including connectors thereon connectible to selected vehicle measurement points;

(c) a pair of datum plane bars connected to respective end portions of said transverse bars perpendicular thereto and positioned on opposite sides of said vehicle;

(d) a pair of standards extending upwardly and perpendicularly to said datum plane bars and said transverse bars;

(e) an upper crossbar mounted to and extending perpendicularly between said standard and parallel to said transverse bars;

(f) said transverse bars, datum plane bars, standards and crossbar all having scale indicia thereon;

(g) a plurality of sighting instruments emitting planes of laser light and means slidably mounting said sighting instruments on said datum plane bars and said crossbar so that said planes project perpendicularly therefrom; and including (i) a first sighting instrument mounted on said crossbar, projecting a vertical plane of light, and establishing an X axis; and (ii) a second sighting instrument mounted on one of said datum plane bars and projecting a vertical plane of light, thereby establishing a Y axis, and intersecting the plane of light from said first sighting instrument whereby a point on said vehicle can be expressed in X, Y coordinates and its position determined on said vehicle.

7. An alignment measuring and checking apparatus for vehicle frames and bodies comprising:

(a) a pair of transverse bars having opposite end portions;

(b) mounting means positioning said transverse bars beneath said vehicle and including slide members translatable on said transverse bars and having connectors thereon connectible to selected vehicle underbody portions corresponding to vehicle measurement points;

(c) a pair of datum plane bars connected to respective end portions of said transverse bars perpendicular thereto and positioned on opposite sides of said vehicle;

(d) a pair of standards connected to and extending upwardly and perpendicularly to said datum plane bars and said transverse bars;

(e) an upper crossbar mounted to and extending perpendicularly between said standards and parallel to said transverse bars;

(f) said transverse bars, datum plane bars, standards and crossbar all have scale indicia thereon;

(g) a plurality of sighting instruments emitting planes of laser light and means slidably mounting said sighting instruments to said datum plane bars, standards, and crossbar so that said planes project perpendicularly thereto; and including;

(i) a first sighting instrument mounted on said cross bar, projecting a vertical plane of light, and establishing an X axis;

(ii) a second sighting instrument mounted on one of said datum plane bars and projecting a vertical plane of light intersecting the plane of light from said first sighting instrument, thereby establishing a Y axis; and (iii) a third sighting instrument mounted on one of said standards and projecting a horizontal plane of light, intersecting the planes of light from said first and second sighting instruments, thereby establishing a Z axis, whereby any point on said vehicle can be expressed in X, Y and Z coordinates and its position determined on said vehicle.

* * * * *